United States Patent
Shiozawa et al.

(10) Patent No.: US 6,765,850 B2
(45) Date of Patent: Jul. 20, 2004

(54) OPTICAL DISC APPARATUS AND INFORMATION RECORDING APPARATUS USING THE OPTICAL DISC APPARATUS

(75) Inventors: Akinori Shiozawa, Hitachinaka (JP); Hisataka Sugiyama, Kodaira (JP); Masataka Ohta, Hitachinaka (JP); Hiroaki Ono, Mito (JP); Hiroyuki Minemura, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 356 days.

(21) Appl. No.: 09/928,341

(22) Filed: Aug. 14, 2001

(65) Prior Publication Data

US 2002/0186634 A1 Dec. 12, 2002

(30) Foreign Application Priority Data

Jun. 11, 2001 (JP) ........................................ 2001-174974

(51) Int. Cl.$^7$ ................................................ G11B 7/00
(52) U.S. Cl. ................................. 369/47.52; 369/47.53; 369/47.55
(58) Field of Search ............................... 369/47.5, 47.51, 369/47.52, 47.53, 53.31, 53.37, 116, 47.54, 47.55

(56) References Cited

U.S. PATENT DOCUMENTS 6,052,347 A * 4/2000 Miyata .................... 369/47.53
6,404,712 B1 * 6/2002 Lee et al. ................ 369/47.53
6,621,779 B1 * 9/2003 Inokuchi et al. ......... 369/47.51
6,646,965 B1 * 11/2003 Kim ........................ 369/47.53

* cited by examiner

Primary Examiner—Doris H. To
Assistant Examiner—Jorge L Ortiz-Criado
(74) Attorney, Agent, or Firm—Antonelli, Terry, Stout & Kraus, LLP

(57) ABSTRACT

An optical disc apparatus including a system controller that receives a recording control command via an interface. A recording control block that receives a recording method command signal indicative of one of recording with verify and real time recording and recording data from the system controller. An optical head that modulates the power of laser beam using a recording pulse sent from the control block and records the recording data on an information recording medium. The recording data is recorded in the information recording medium according to the recording with verify and the real time recording using different recording power respectively, in which under the recording with verify, the recording power determined by recording compensation learning is used, and under the real time recording, the recording power higher than the recording power obtained by the recording compensation learning is used.

11 Claims, 14 Drawing Sheets

RECORDING POWER DEPENDENCY

CROSS ERASE CHARACTERISTIC

MANAGEMENT INFORMATION DATA

RECORDING WITH VERIFY

MOVING IMAGE DATA

REALTIME RECORDING

OPTICAL DISC APPARATUS AND INFORMATION RECORDING APPARATUS USING THE OPTICAL DISC APPARATUS

BACKGROUND OF THE INVENTION

Recording type optical discs have the characteristics that can record a large amount of information and enable media conversion. The recording of information into an optical disc that is a recording medium is performed by irradiating the information recording surface of the optical disc with laser beam of higher power than reconstructed light and thermally forming a recording mark. The reproduction of information is performed by condensing the laser beam on the information recording surface of the optical disc and detecting the reflected light modulated by the recording mark. The recording type optical disc are roughly divided into three types of magneto-optical, phase change, and ablation discs. There are a MO of a magneto-optical type and a DVD-RAM of a phase change type as rewriting applications, and an ablation type disc that uses organic coloring matter and is typified by a CD-R and a DVD-R has come into wide use as a write-once application in which data can be recorded only once.

Among various optical discs, attention is being paid to a DVD that can handle a large amount of information, such as a computer, images, and music, by a common medium as a new mass storage medium, such as a PC and AV equipment, and the market is expanding. The second generation 4.7 GB DVD-RAM has appeared as the mass storage media.

Since a smaller mark needs to be formed precisely to obtain a high-density recording type optical disc, the precise control of recording power (laser beam power for recording) is necessary. However, it is difficult to form a recording mark of a predetermined size on the information recording surface in a practical optical disc apparatus due to the recording sensitivity dispersion of the recording film of a recording medium even if the laser output is kept constant because of the effect caused by a dynamic change, such as an ambient temperature, a laser wavelength, or distortion of an optical spot. Accordingly, a technique called recording compensation learning that obtains the optimum value of the recording power and secures a recording margin by performing a trial write operation in the test area provided in the optical disc before the information is recorded has been used up to this date.

Regarding the recording compensation learning technique, an example is disclosed in JP-A No. Hei 11-296858. In optical discs for recording, there are two recording methods for computers and AV equipment. Regarding the former, to secure the reliability of recorded information, a reproduction check and verify are performed in the rotation after the information is recorded. If an error rate is high in this reproduction check, recording is retried and this is called retry processing. For a DVD-RAM, data is recorded at a random position on an optical disc according to a command from a host computer in a unit of 2,048 bytes. The data of the single unit is called one sector and collected 16-sector data may be called one block.

On the contrary, in the AV equipment that mainly uses moving image recording, since real time recording is used, recording without verify is presupposed. The real time recording is a recording method standardized in the DVD video recording standard of the DVD-RAM Book 2.0, and is a system for recording continuously-timed information, such as moving images and voices. This recording method continuously records data without performing verify and a retry not to omit the recorded information.

Since the DVD-RAM enables a multi-purpose application, in some case, personal computer data and the image information of the AV equipment are mixedly recorded on the same disc in the same apparatus. In such case, the recording into a conventional rewrite-enable optical disc is performed using the same recording power instead of the recording methods (real time recording and recording with verify).

The recording according to the recording compensation learning system is performed to reduce the effects of the dispersion of an information recording medium and an information recording apparatus and a dynamic change by ambient environment, such as temperatures. In actual, there are many factors that narrow the margin (range of the recording power that can normally perform recording) of the laser power for recording due to the following factors, and the power margin for recording needs to widely be secured to ensure the high reliability of the recorded information.

Hereupon, the concept of the recording power setting considered regarding the power margin of an optical disc for recording is described below.

FIG. 2 shows the relationship of a jitter when the recording power and the recorded part are reproduced. At the low power side, the formation of a recording mark becomes unstable and the jitter suddenly increases. In particular, spot distortion is cited as a dominant change factor that deteriorates the recording power margin. The occurrence factors of the spot distortion include coma due to a disc tilt, spherical aberration due to the dispersion of disc plate thickness, and focal misalignment due to servo tracking misalignment.

FIG. 3 shows the relationship between the jitter increase and recording power at the high power side. The dominant mechanism of the jitter increase in the recording of the high power side is the effect due to the cross erase from the adjacent track, and the higher recording power track frequently receives the effect from the adjacent track. The cross erase indicates that part of the recording mark of the track due to the thermal effect when data is recorded in the adjacent track is erased (because a write-once-read-only DVD-RAM or the like uses a phase change, it is re-crystallized) and signal quality deteriorates. In an optical disc apparatus, care needs to be taken not to deteriorate the signal quality until the adjacent track cannot be reproduced by the cross erase.

When the practical optimum recording condition is obtained, the recording power in which a recording mark can stably be formed, and, still more, that will not affect the adjacent track needs to be set in consideration of the factors that determine the jitters of both sides (high power and low power) of the power margin. For the power setting, the learning is performed at the predetermined place of the optical disc and the recording power is determined.

When the information recording method is a recording with verify, since it is the recording method used to record management data, overwrite that rewrites the same part many a time, such as update of the management data, frequently occurs. The management data extends over multiple tracks on the disc. Accordingly, when attention is paid to one block, the overwrite of tracks on both sides frequently occurs. This indicates that the tracks are affected (meshed part) by the cross erase from both the sides as shown in FIG. 12(a). The deterioration of a recording mark due to the cross erase decreases a regenerative signal amplification level and makes a signal to noise (S/N) ratio worse. Further, Every time the overwrite that updates management information is performed, since recording conditions change due to disturbance, such as temperature, spot distortion, and track offset, the cross erase further becomes easy to occur to the adjacent track in accordance with the frequency of the overwrite. For the state of things, an example in which the track offset occurs due to a disc tilt or the like is typically shown in FIG. 13(a). For the recording with verify, since the recording conditions change every time the overwrite is performed, the offset direction and quantity change. Accordingly, the cross erase may frequently occur against the track adjacent to the direction. In general, the cross erase due to disturbance or the like is prevented from occurring by suppressing the recording power in consideration of these effects. For the recording with verify, since recording is retried changing a parameter or the like regarding the part where a recording mark could not be formed correctly by suppressing the recording power, the reliability of the recorded information can be secured. However, for the real time recording, since verify and a parameter change or retry operation are not performed, how the reliability of the recorded information is secured comes into question.

An object of the present invention is to solve the above problems and secure the reliability of the recorded information for the real time recording.

SUMMARY OF THE INVENTION

The present invention relates to a record-enable optical disc apparatus, and, more particularly, to a recording method.

The problems noted above can be solved by the following means.

According to an aspect of the present invention, the optical disc apparatus has a system controller that receives a recording control command via an interface, a recording control block that receives a recording method command signal and recording data from the system controller, sets a recording power level in accordance with the recording method specified with the recording method command signal, and converts recorded information to the format of a recording mark and generates a recording pulse, and an optical head that modulates the power of laser beam using the recording pulse sent from the control block and records the recording data on an information recording medium, and is characterized in that information is recorded in the information recording medium according to at least two information recording methods using different recording power respectively.

Further, according to another aspect of the present invention, the two information recording methods have recording with verify and real time recording, and the recording power that records information uses the recording power determined by recording compensation learning and the higher power than the recording power obtained by the recording compensation learning. The recording power used in the two information recording methods may also use the recording power determined by different recording compensation leaning respectively.

Furthermore, according to another aspect of the present invention, it is also effective to record one track or more at the head and end of the file of the data recorded for the real time recording using lower recording power, it is also effective to record the recording data of the number of blocks including the one track or more at the head and end of the file of the data recorded for the real time recording using the lower recording power, and it is also effective to record only the recording data of the number of sectors for one track or more at the head and end of the data recorded for the real time recording using the lower recording power.

Moreover, according to another aspect of the present invention, it is also effective to determine the recording power toward the radial direction based on the linear approximation of the recording power obtained by the recording compensation learning respectively in which the recording power is obtained on the inside tracks and outside tracks respectively according to the two information recording methods, in the mode in which the recording data is recorded at a fixed angular velocity.

According to another aspect of the present invention, the information recording apparatus that uses the optical disc apparatus has an input unit that inputs either moving image information or voice information or both, a unit that digitally compresses input data, an optical disc that can reproduce recorded data, and a controller, and uses any form of the optical disc apparatus.

According to another aspect of the present invention, In particular, the information recording apparatus as a video camera has an image pick-up lens, an image sensor that converts an image focused by the image pick-up lens, a unit that digitally compresses the output of the image sensor, an optical disc apparatus that can reproduce recorded data, and a controller, and uses any form of the optical disc apparatus. Further, the digital compression unit uses the MPEG-2 system.

Furthermore, as more specific recording data, the information recorded for the recording with verify is navigation data, and the information recorded for the real time recording is presentation data.

According to the unit, when the real time recording is performed to an information recording medium, the edge of a recording mark is stabilized by recording the recording mark using the higher recording power obtained by the recording compensation learning and the jitter is improved. A more detailed description is as follows.

When the recording power is shifted to the high power side according to the value obtained by the learning as described above, the cross erase due to thermal interference with the adjacent track is feared. However, it becomes known that there is a margin against this effect for the real time recording. The reason is described below. As shown in FIG. 4, for a DVD-RAM, an optical disc 1 sequentially arranges a pair of an address part 13 that indicates its physical position every unit information and a track 12 that records recorded information, and the track 12 has the structure in which the track of a land 10 that is the optical disc substrate surface every track and the track of a groove 11 that is the slot provided on the substrate surface are alternately replaced every round. For the real time recording, the track that is alternately adjacent to the land 10 and the group 11 from the inside tracks is sequentially recorded only once toward the outside tracks. This indicates that there are two characteristics advantageous for the cross erase. First, for the real time recording, since data is successively recorded from the inside tracks toward the outside tracks and there is no retry, the effect due to the cross erase may be considered only once when the outside track of the track is recorded. This indicates that for the recording of the management information, as shown in FIG. 12(a), both sides of the recording mark of the track are erased due to the cross erase, whereas for the real time recording, such as moving image data, as shown in FIG. 12(b), the effect of the cross erase is produced only from the outside. Therefore, the decrease of a regenerative signal level is slight. Secondly, as shown in FIG. 13(b), for the real time recording, since data is recorded only once in the same condition, the recording mark of each track is offset in the same direction even if track offset occurs. Since the distance from the mark of the adjacent track does not change substantially, most of the effects due to the track offset can be ignored. Accordingly, for the real time recording, the ratio at which the effect of the cross erase is received is considered exceedingly low compared with the recording with verify. The result of an experiment shown in FIG. 5 proves that the jitter of real time recording 15 is lower than the recording with verify 14 in the area where the recording power is high, and the consideration described above is backed up.

The object described above can be attained by applying the result and setting recording power 17 for the real time recording higher than recording power 16 for the recording with verify.

Besides, this system can also be applied to not only a phase change optical disc and but also a magneto-optical disc and an ablation type write-once optical disc.

According to the present invention, an optical disc apparatus provided with an optical head that records recording data on an information recording medium, the reliability of recorded information can be secured by recording information in the information recording medium using different recording power respectively according to at least two information recording methods.

Further, in particular, when the two information recording methods are the recording with verify and the real time recording, the reliability of the recorded information for the real time recording can be secured.

DESCRIPTION OF THE PREFERRED EMBODIMENTS

First Embodiment

Figure 1:
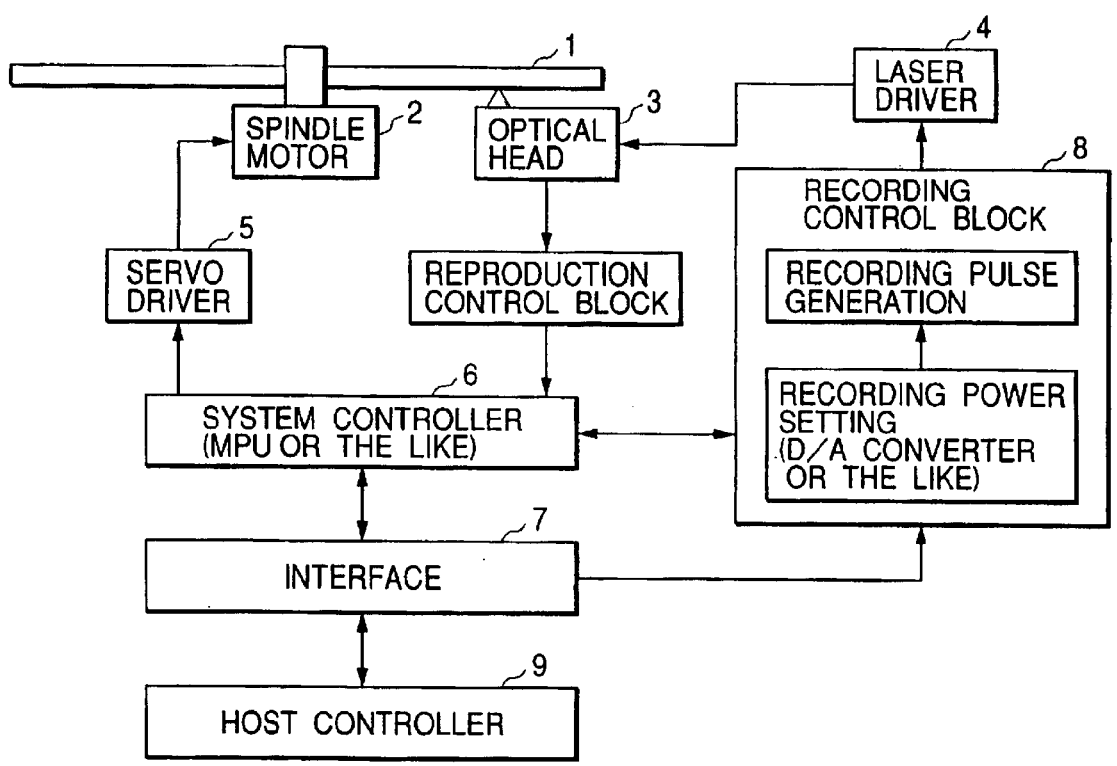
FIG. 1 is a block diagram showing the configuration of a first embodiment of the present invention.
Figure 2:
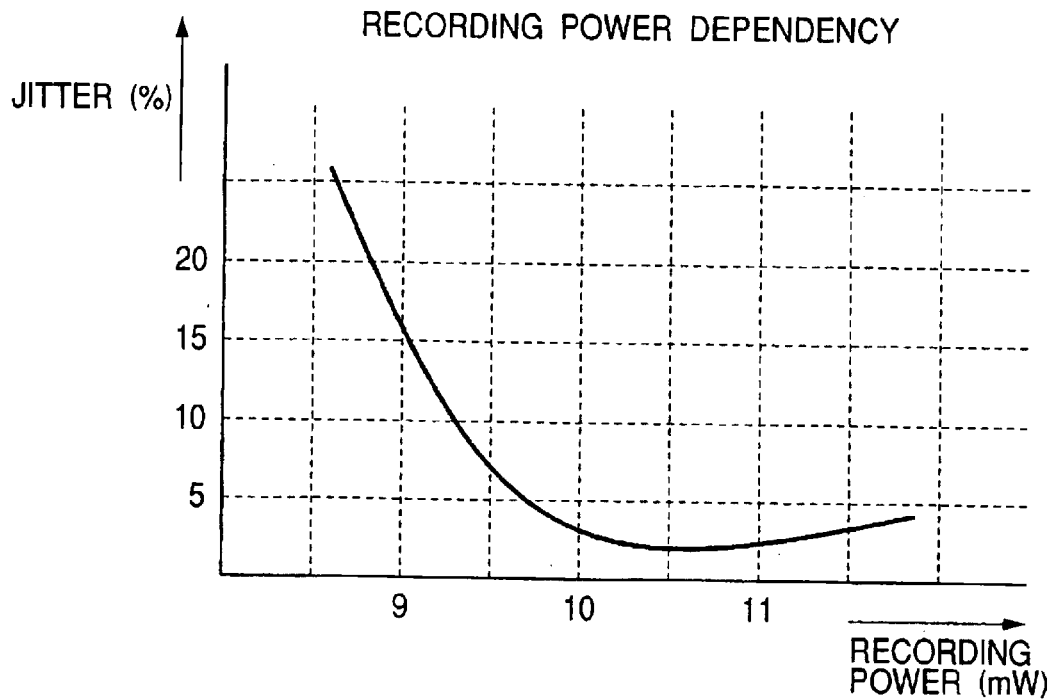
FIG. 2 is a drawing showing the relationship between recording power and a jitter.
Figure 3:
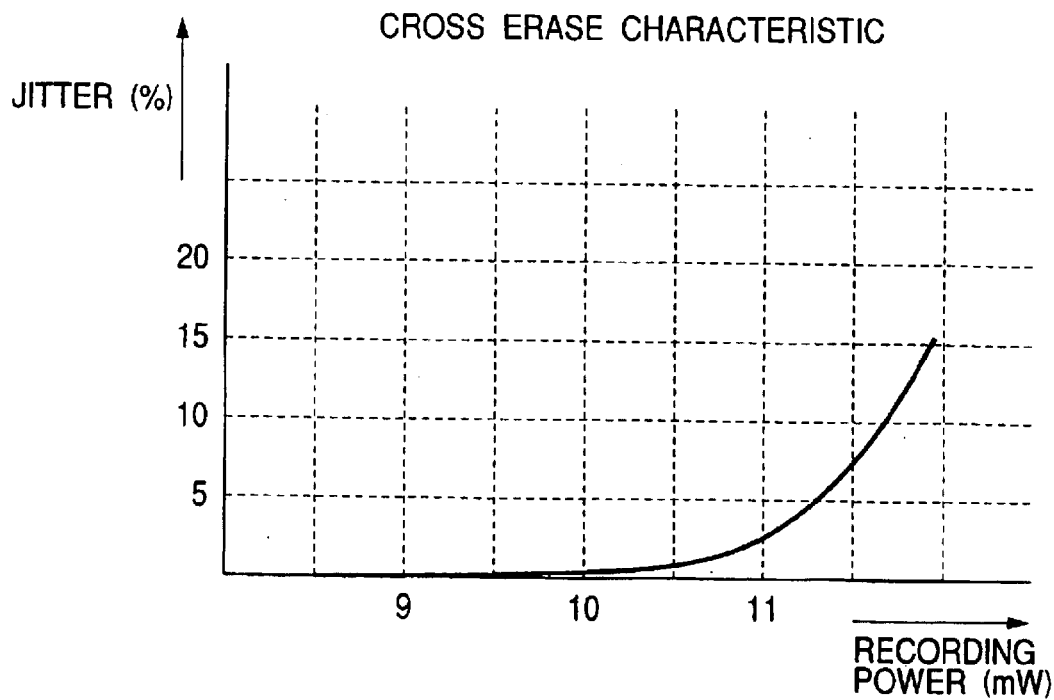
FIG. 3 is a drawing showing the relationship between the recording power and cross erase.
Figure 4:
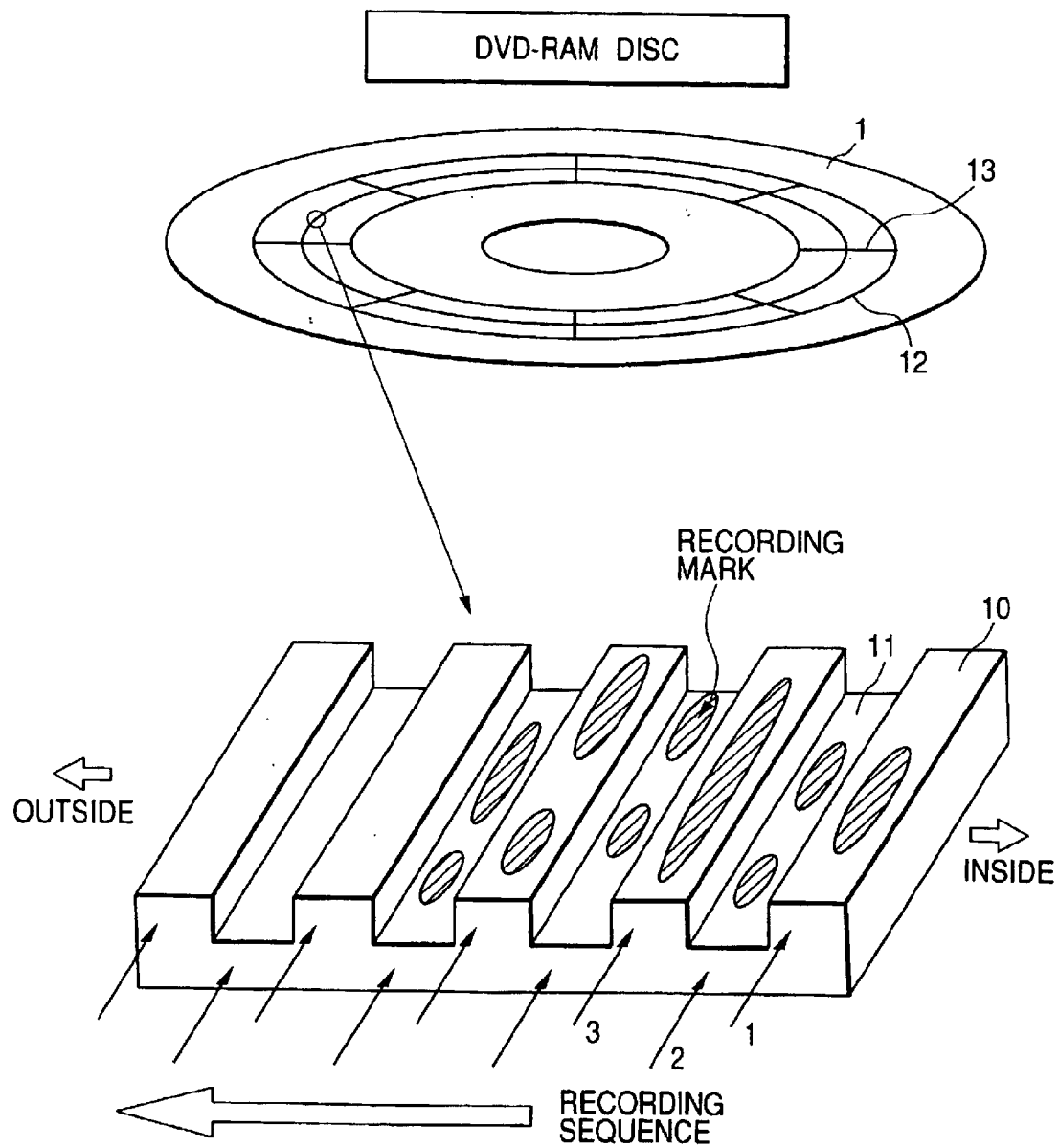
FIG. 4 is a drawing showing real time recording.
Figure 5:
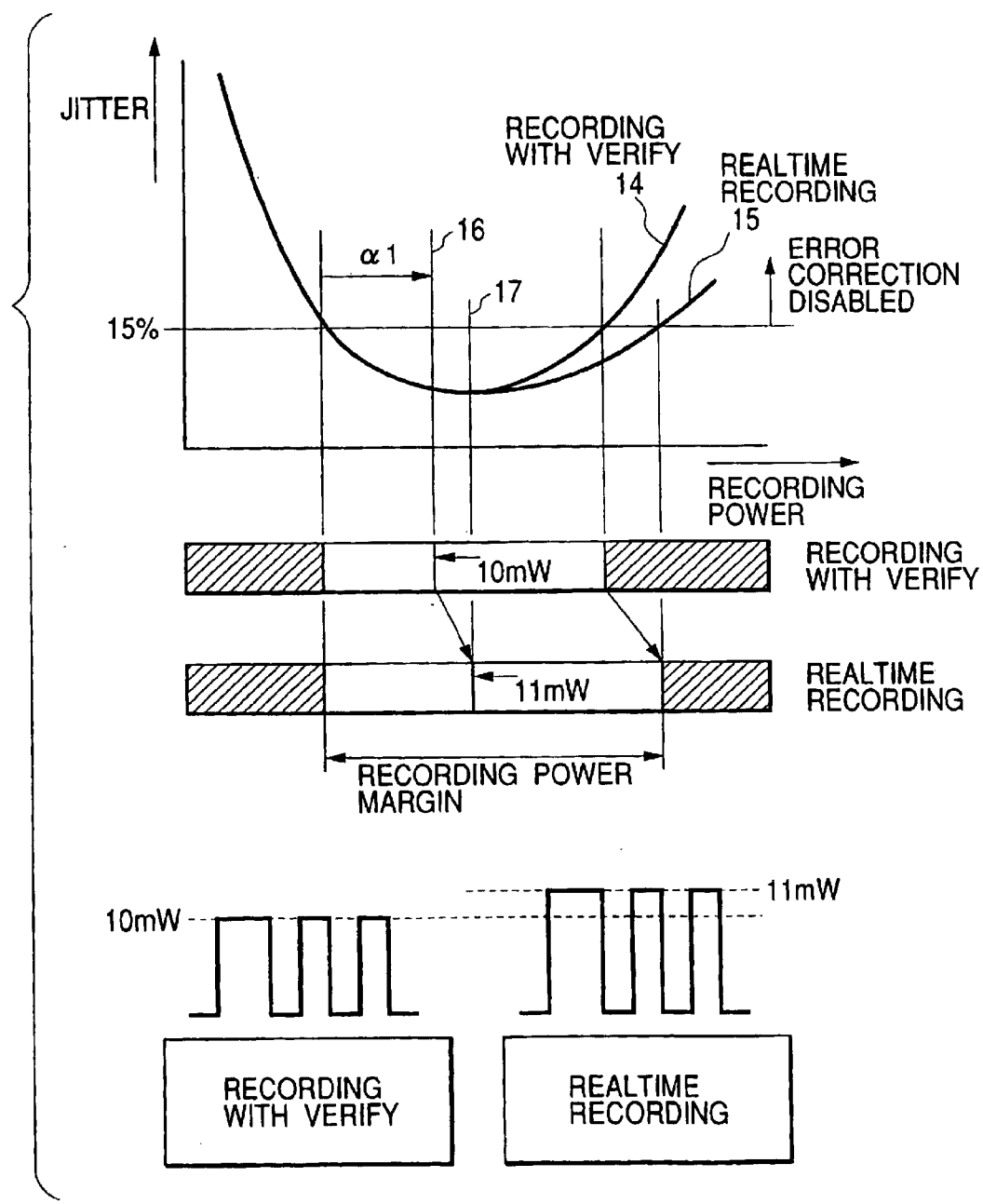
FIG. 5 is a drawing showing a recording power margin for the recording with verify and real time recording.

Next, the embodiments of the present invention are described with reference to the drawings. FIG. 1 is a block diagram showing the configuration of a first embodiment of the present invention. This embodiment consists of a host controller 9, a recording control block 8, an interface 7, a system controller 6, a servo driver 5, a semiconductor laser driver 4, an optical head 3, a spindle motor 2, and an optical disc 1.

The host controller 9 is a recorded information source, and, for example, includes a camera, a recorder, a tuner or the like, but it is not limited to this source. The host controller 9 sends a recording control command to the drive side via the interface 7. The system controller 6 that receives the recording control command sends a recording method command signal and recording data to the recording control block 8. The recording control block 8 generates a recording pulse by setting a recording power level in accordance with a specified recording method or performing 8/16 conversion that converts the additional and recorded information of an error correction code to the format of a recording mark. The recording pulse is sent to the ID semiconductor laser driver 4 and drives the semiconductor laser, then emits laser beam. The recording film surface of the optical disc 1 is irradiated with the laser beam emitted from the optical head 3 consisting of semiconductor laser, an optical system, and a moving mechanism, and a recording mark is formed. The optical disc 1 is rotated and controlled at a ZCLV (zoned constant linear velocity) by the rotary mechanism of the spindle motor 2 and the servo driver 5.

In the apparatuses mentioned above, the recorded information sent from the host controller 9 is defined in the video recording standard for AV equipment, and includes presentation data, such as moving images and voices encoded in the program stream format of the MPEG (moving picture experts group) standard, and navigation data, such as management information in which the address information necessary for access to the presentation data and the information necessary for a user interface are stored. These information are continuous information with time, such as the moving images and voices. Thus, a recording system without verify is used as the recording system when an emphasis is laid on real time for the recording of information sent from the host controller.

Further, in order to record the data sent continuously with time without omitting it, such as presentation data, the recording rate at which the data is recorded on the optical disc must be higher than the transmission rate of the information sent from the host controller 9, and, only at that time, the information sent can continuously be recorded. Accordingly, a recording method of real time recording without verify is used for the recording of such information. Further, a recording method in which an emphasis is laid on reliability is desirable, and a recording method with verify is used in most cases.

In a practical application, the information of a different property is recorded on one disc in this manner, and the respective different recording methods are used.

This embodiment is described using a second generation DVD-RAM as an example.

Figure 6:
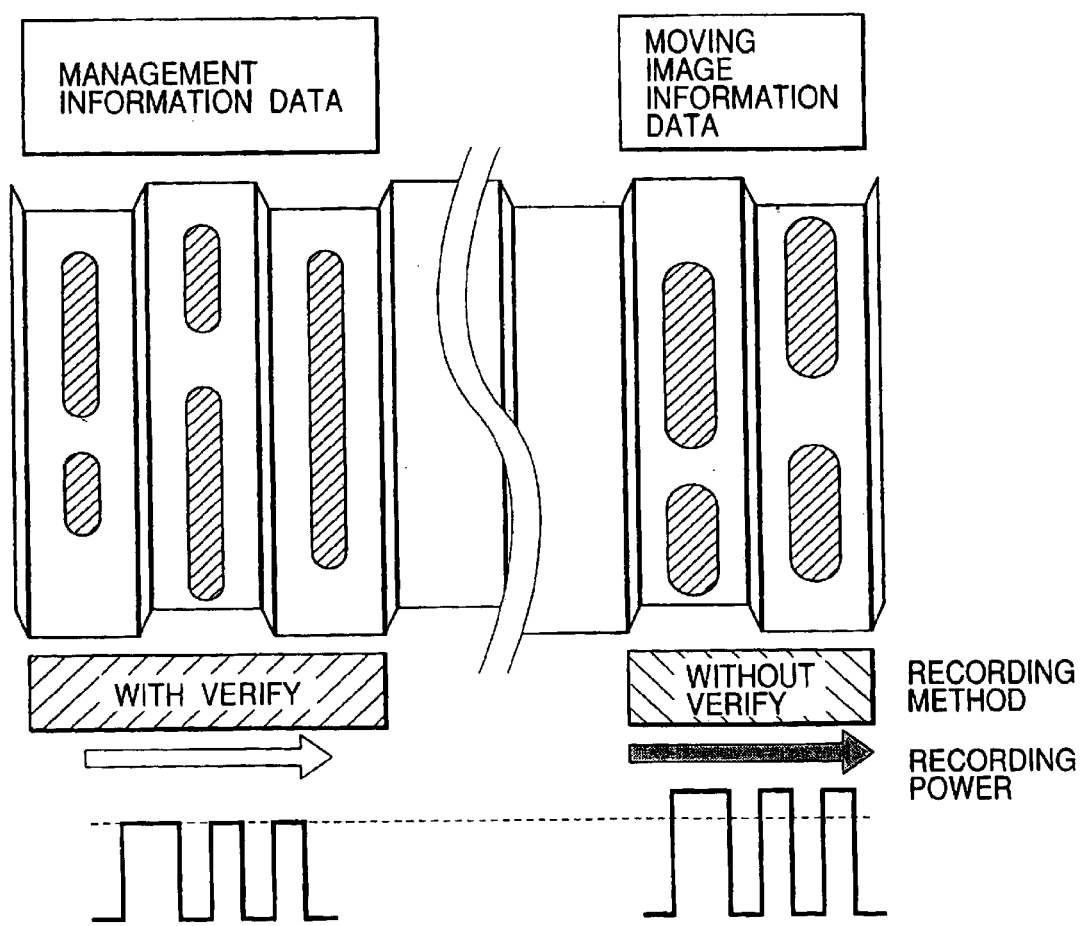
FIG. 6 is a drawing showing a recording mark of the management data area and the image data area according to the first embodiment.

The system controller 6 of FIG. 1 is used to specify the recording method of either the real time recording or the recording with verify for recorded information. Accordingly, the 10 mW recording power is set in the recording power level setting register of the recording control block 8 for the recording with verify and the 11 mW recording power is set in it for the real time recording. As shown in FIG. 6, by forming a recording mark using the set recording power, high reliability recording with a small jitter is enabled even in the real time recording method without verify. Besides, the range of a reproducible disc tilt (inclination of a disc to laser beam) extends from 0.3 degree to 0.5 degree due to the improved recording stability of a recording mark caused by switching the recording power of the present invention for the real time recording to high power.

Further, this embodiment is described assuming the recording setting power of a land and a group as the same setting. However, in the recording control block 8, the individual recording power for the land and group can also be set. This further enables information recording with reliability.

Second Embodiment

Figure 7:
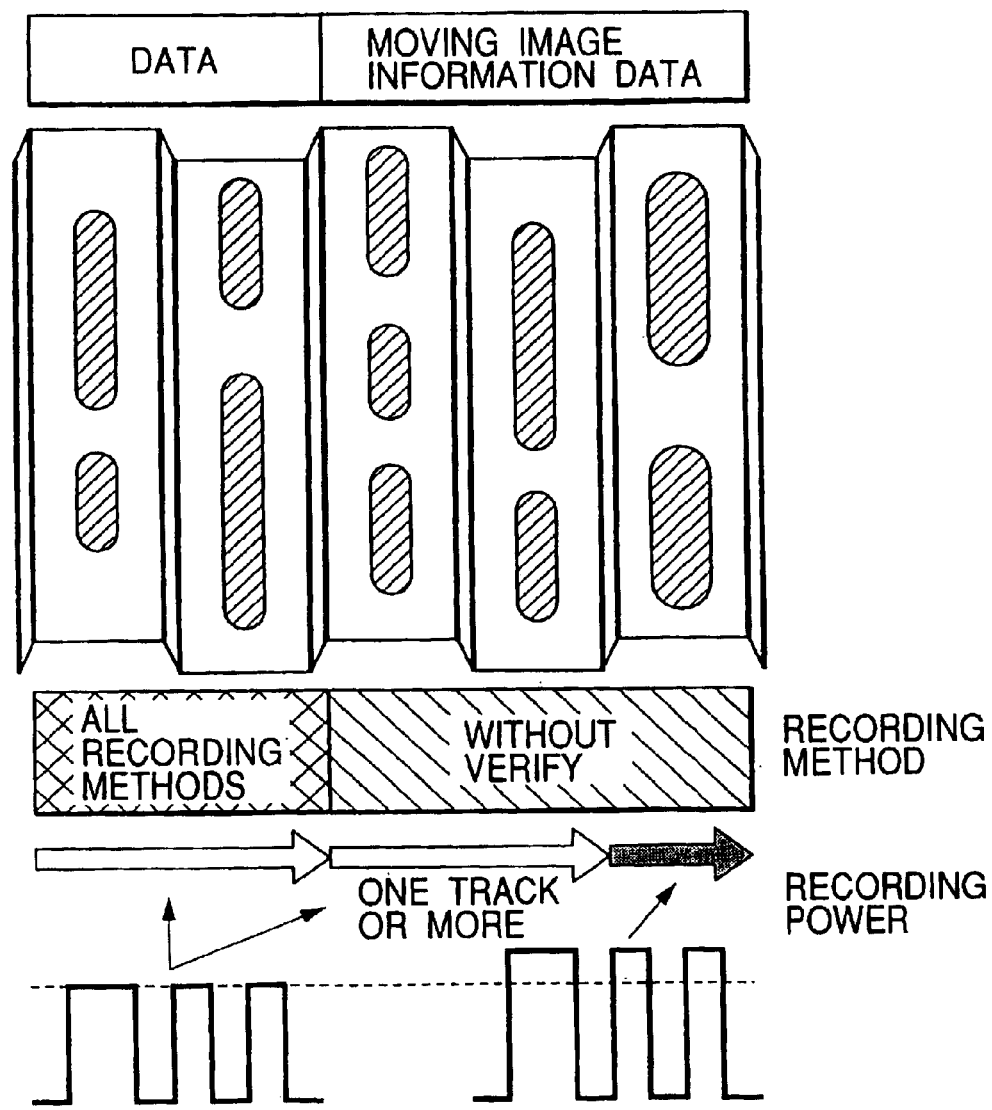
FIG. 7 is a drawing showing recording power control when unspecific data and image data are adjacent according to a second embodiment.

In the real time recording standard, to effectively use the capacity of a disc, data is split into a physically discrete place, such as a blank part, that is deleted by editing or the like and is recorded. Accordingly, there are various formats of data, such as management information of presentation data and navigation data in the adjacent track of the first and last tracks of the respective split recording data. Then the data for the ten blocks at the start and end of a data block for the real time recording is recorded using the same power 10 mW as the recording with verify. The possibility of cross erase of the part recorded in real time to the adjacent track can be reduced and reliability can be secured. FIG. 7 typically shows the state of things. The two tracks on the left of FIG. 7 are already recorded parts where all recording methods can be found. The central two tracks indicate the top ten blocks for the real time recording, and the one track on the right end indicates the succeeding part for the real time recording. Since this part is slightly high in the recording power, a recording mark is correctly formed. In this case, on the contrary, in the first and last parts for the real time recording, the effect of reliability improvement according to the present invention is not anticipated. However, regarding the information about a moving image recorded in real time, even if the data for the first and last ten blocks that correspond to the gaps of the image is damaged, no image problem is arisen in particular. Since this method hardly produces conditional processing, the system can be simplified and the effect of securing the reliability of recorded information is also great.

In this embodiment, although the ten blocks are used, an equivalent effect can be obtained for the number of blocks containing one block or more. For example, for a 120 mm disc, in the outermost tracks zone, one track is 59 sectors. So if four blocks are provided, they are satisfactory.

Third Embodiment

Figure 8:
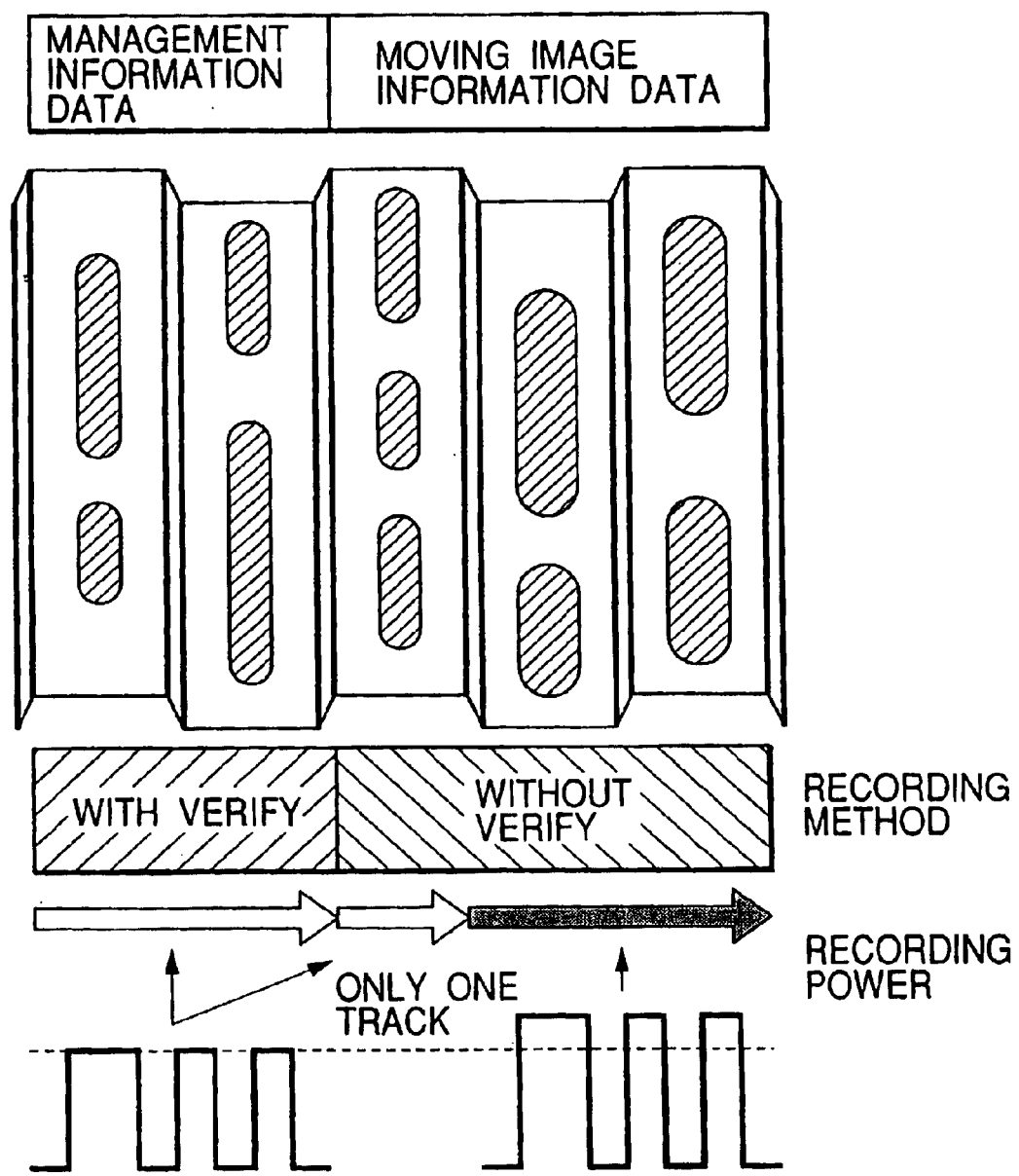
FIG. 8 is a drawing showing that only one track adjacent to management data is recorded using normal power according to a third embodiment.

In a third embodiment, as shown in FIG. 8, for the real time recording, so long as there is the data that requires verify, such as management data, in the adjacent track, the data is recorded for only the adjacent one track using the same recording power as the recording with verify.

Figure 9:
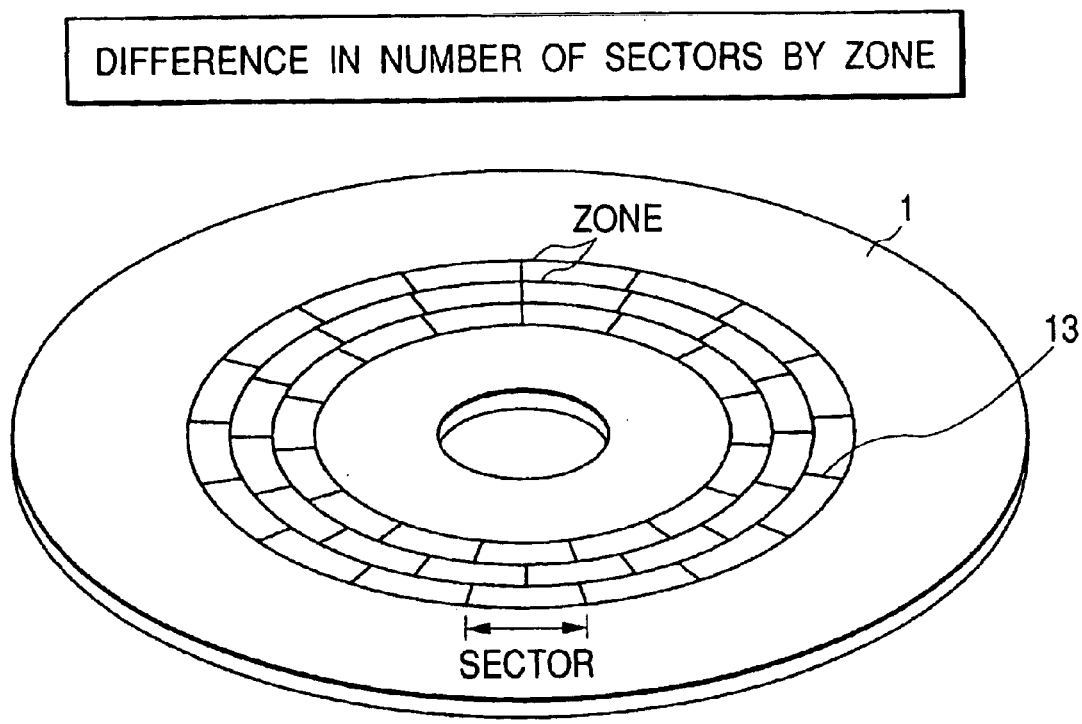
FIG. 9 is a drawing showing the difference in the number of sectors by the zone of a DVD-RAM disc.

Since a DVD-RAM has the ZCLV format, as shown in FIG. 9, the number of sectors of one track depends on a zone where data is recorded. That is, the recording power needs to be switched in sector units.

The system controller 6 of FIG. 1 checks that management data is written to the adjacent track of the part to subsequently be recorded in real time referring to a file system. If no management data is provided, the data is recorded by uniformly increasing the power according to the system of the first embodiment. When there is the management data, the data is recorded for only one track using the recording power for the recording with verify. Hereupon, the number of sectors for a round of the zone where the real time recording is identified referring to a management file system for navigation data or the like. Further, there is also a method of detecting the single round with the FG (frequency generator) signal of a spindle motor using hardware. Thus, only the number of sectors of track 1 (first round) adjacent to management data is recorded in such manner using the 10 mW power recording for the recording with verify, and recorded using the 11 mW power recording for the real time recording from track 2 (second round). For example, in a 120 mm disc, on the outermost tracks, one track is 59 sectors. Accordingly, data is recorded for the 59 sectors using 10 mW and recorded from the 60th sector and later using 11 mW. Recording using this method can protect the track in which important data, such as management data, is recorded from the effect of the cross erase. Also, regarding the track in which the data recorded for the real time recording is recorded, since the part where the deterioration of a recording mark due to the cross erase is feared is settled in the minimum number of sectors, data reliability can be secured.

The embodiment described above is described assuming a DVD-RAM. It is not limited to this DVD-RAM, and the same effect can be obtained even for a DVD-R.

In the first, second, and third embodiments, the recording power level switched for the real time recording is uniformly defined as 11 mW. However, the level is not limited to this value. Therefore, the improvement effect of the reliability can be anticipated for the real time recording only by using the plus 5% higher recording power than for the recording with verify as an example.

Fourth Embodiment

A method for positively obtaining the recording power, too, for the real time recording is described here so that the effect of the present invention can be anticipated to the utmost.

A method of recording compensation learning for obtaining the recording power used for the recording with verify and a method that performs the recording compensation learning for obtaining the recording power used for the real time recording are described below.

Figure 10:
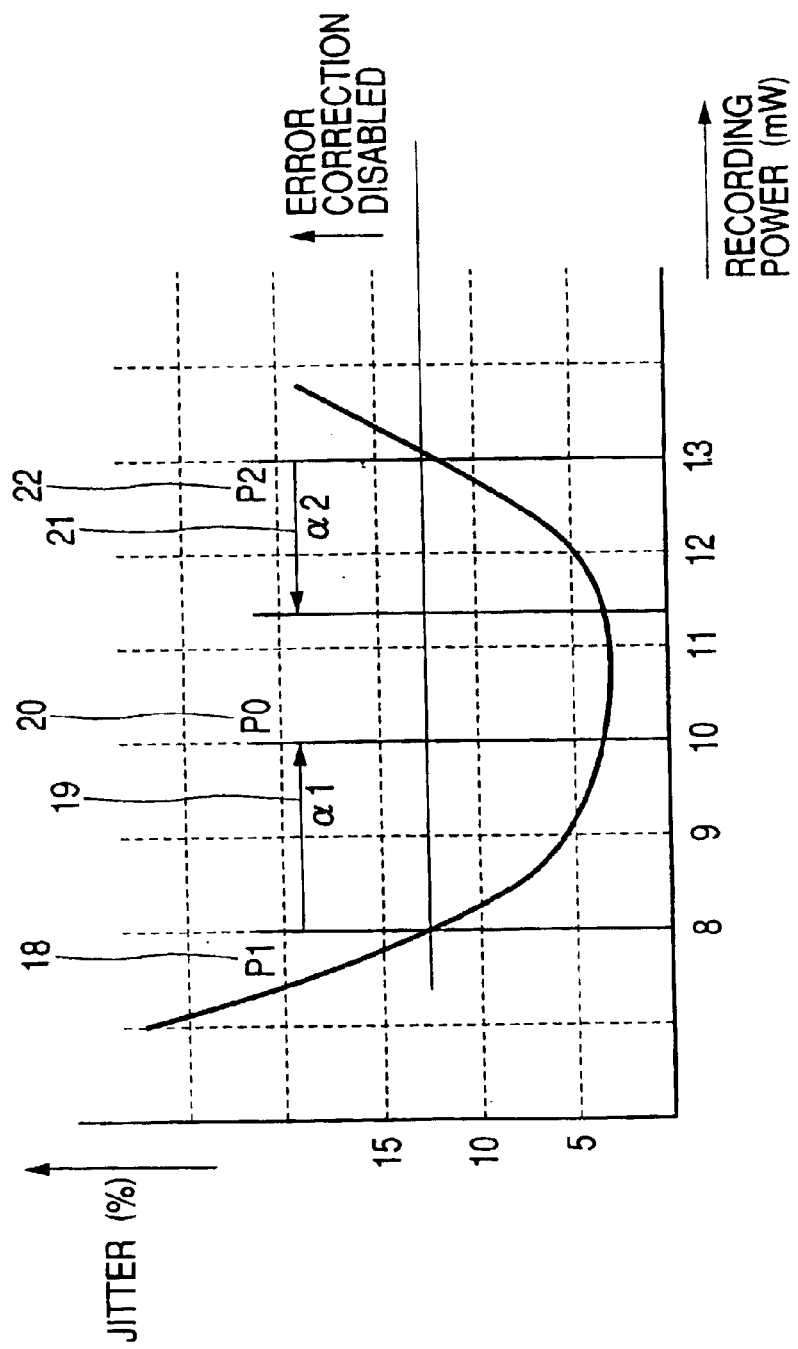
FIG. 10 is a drawing showing a power margin for recording compensation learning.

First, an example of the method for setting the optimum recording power in the situation where the effect of the cross erase for the recording with verify cannot be ignored is described using a DVD-RAM as the example. FIG. 10 shows a recording margin curve of the recording compensation learning in a condition equal to practical use in which the cross erase due to the adjacent track is considered.

In the recording compensation learning, a mark for recording learning is recorded sequentially increasing the recording power from the low power side to the high power side and the jitter at that time is measured. Hereupon, recording power P1 (18) of the jitter value in which error correction disabled will not occur is obtained. Usually, recording power P0 (20) is obtained by multiplying the P1 by coefficient $\alpha 1$ (19) predetermined according to a disc. Further, when the jitter is measured to the high power side, recording power P2 (22) for the jitter upper bound value in which the error correction disabled occurs due to the quality deterioration of a recording mark that will occur due to the effect of the cross erase is obtained. At this time, whether a margin α2 (21) can be secured is checked to prevent the error correction disabled from occurring in the P0. When the margin cannot be secured, P0 is shifted to the low power side and the high power side that receives the effect due to the cross erase always secures the margin. This operation is performed in each drive test zone of the inside tracks and outside tracks of the disc to obtain each P0. A table of the optimum recording power in each zone is created according to the linear approximation of each P0.

Next, the setting method of the record power used in the real time recording is described. After the recording compensation learning of the recording power used for the recording with verify is performed in the drive test zone of the DVD-RAM disc, a recording correction learning pattern is recorded in four tracks from the inside tracks to the outside tracks assuming the real time recording system in an unrecorded part or the four tracks after erase. The central two tracks (tracks affected by the cross erase) of the recorded track are reproduced and the jitter at that time is measured. The recording margin data is acquired by varying the recording power against this operation within the range of 70 to 130% and repeating the operation, and the recording power value in which the jitter value is minimized is obtained. This operation is performed on the inside tracks and outside tracks of the drive test zone respectively. The recording power table is created for each zone by linearly approximating the recording power value obtained respectively.

As a result, the recording with verify and the real time recording can be performed using high reliability recording power in which the disc sensitivity dispersion inside and outside the disc is corrected.

Fifth Embodiment

Next, an example to which the present invention applies is described when the linear velocity for recording changes with a physical position on a disc, such as CAV (constant angular velocity) or ZCAV (zoned constant angular velocity).

Figure 11:
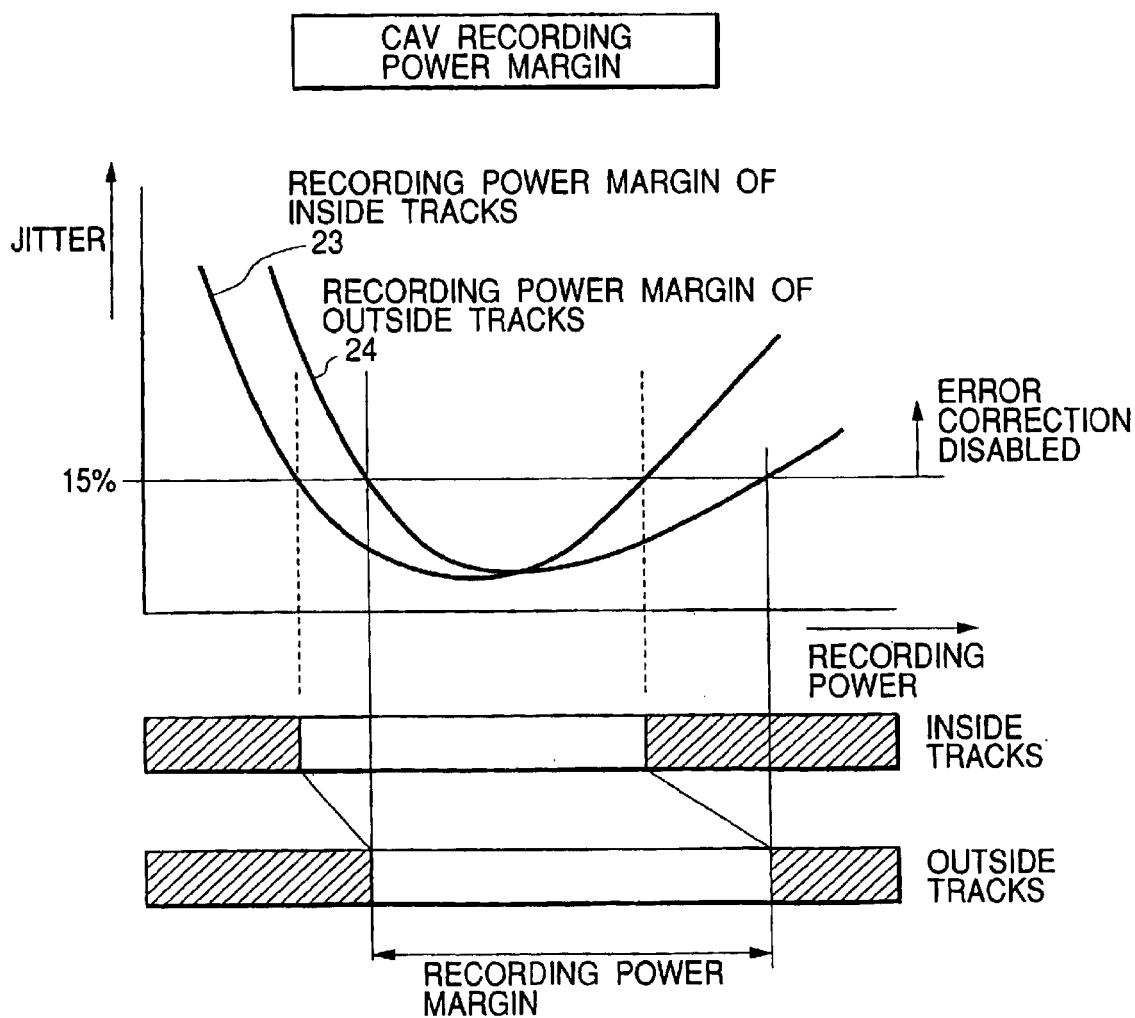
FIG. 11 is a drawing showing a recording margin on the inside tracks and outside tracks for CAV.
Figure 12A:
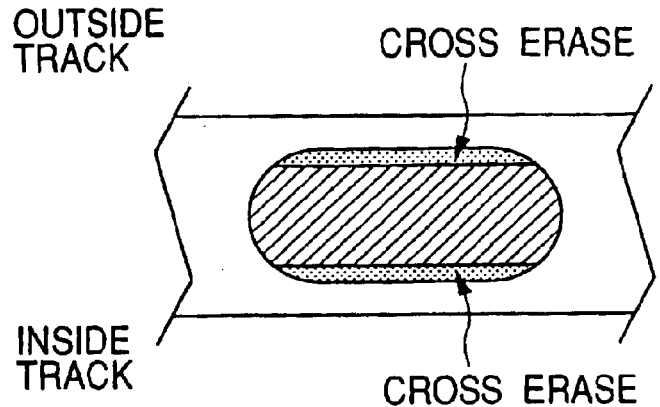
FIG. 12 is a drawing showing the effect of the cross erase according to a recording system.
Figure 12B:
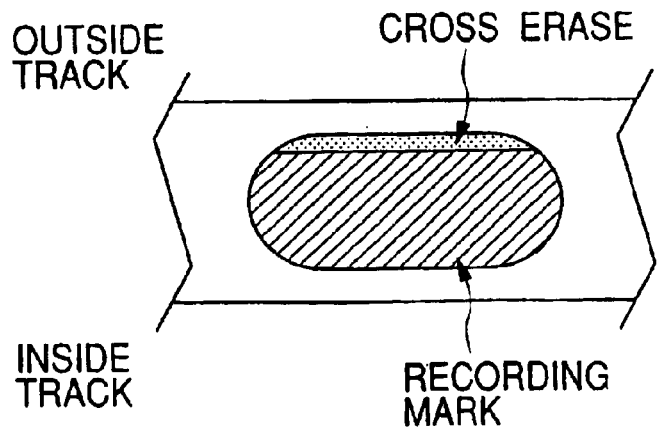
Figure 13A:
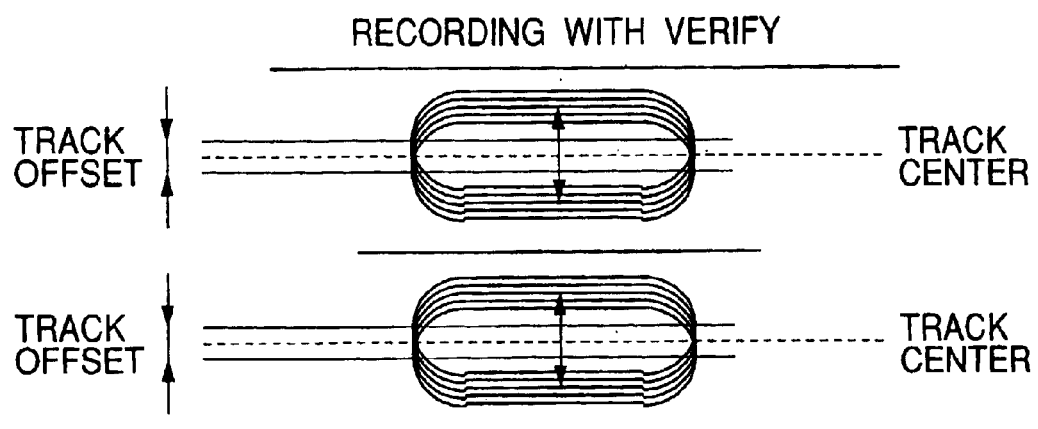
FIG. 13 is a drawing showing the difference in track offset according to the recording system.
Figure 13B:
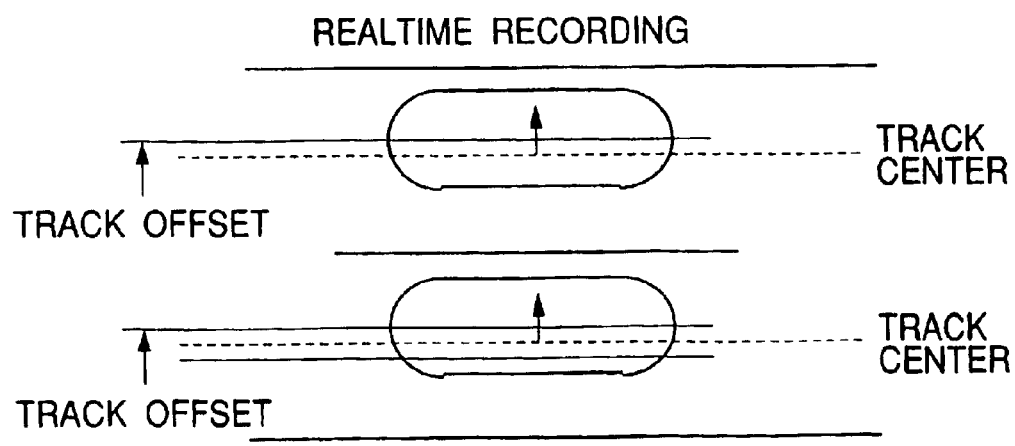

For the CAV, the linear velocity changes with a physical recording position on the disc. On the disc inside tracks, the linear velocity is slowest, and becomes fast as the outside tracks is reached. Although a recording mark is obtained by thermal formation, heating and cooling characteristics are also changed with the change of the linear velocity, thereby also changing the effect of the cross erase due to thermal interference. FIG. 11 shows a recording power margin curve 23 on the inside tracks and a recording power margin curve 24 on the outside tracks. As the outside tracks is reached, the linear velocity becomes fast and quick heating and quick cooling characteristics are obtained. Since the thermal diffusion into the adjacent track decreases, the effect due to the cross erase is reduced and the recording power margin at the high power side is widen. On the other hand, since the linear velocity is high, the temperature becomes difficult to increase and the laser power necessary for the formation of the recording mark becomes high. Then the shape is simply equal on the inside tracks and outside tracks and is shifted in parallel. Thus, the recording methods of CAV and ZCAV differ in the recording margin characteristics on the inside tracks and inside tracks. How to obtain the recording power at the CAV and ZCAV is described below.

The recording power for the recording with verify is obtained in the same manner as the recording compensation learning of CLV and a recording power table is created by linearly approximating the recording power obtained on the disc inside tracks and outside tracks. For the recording compensation learning that obtains the recording power for the real time recording, a land, a group, and each recording margin become known by recording data in the four tracks on the disc inside tracks and outside tracks using the real time recording method, reproducing the data of the central two tracks, and measuring a jitter in the same manner as the fourth embodiment. The recording power table is created for the real time recording by linearly approximating the recording power when the jitter obtained there is minimized on the inside tracks and outside tracks. The recording power table for the recording with verify and real time recording obtained in this manner becomes the approximately optimum recording power that includes the effect of the linear velocity which changes in accordance with the position in the radial direction of the disc. For recording, the system controller 6 determines a recording method and a recording position from the type of the recorded information from the host controller 9 and the file system information. A recording mark can be formed using the desirable recording power that matches the linear velocity by referring to the recording power table and setting the recording power level that corresponds to the determination contents in the recording power setting part of the recording control block. Such method can also secure high reliability of the recording for the real time recording in the optical disc apparatus of the CAV and ZCAV systems.

Sixth Embodiment

Figure 14:
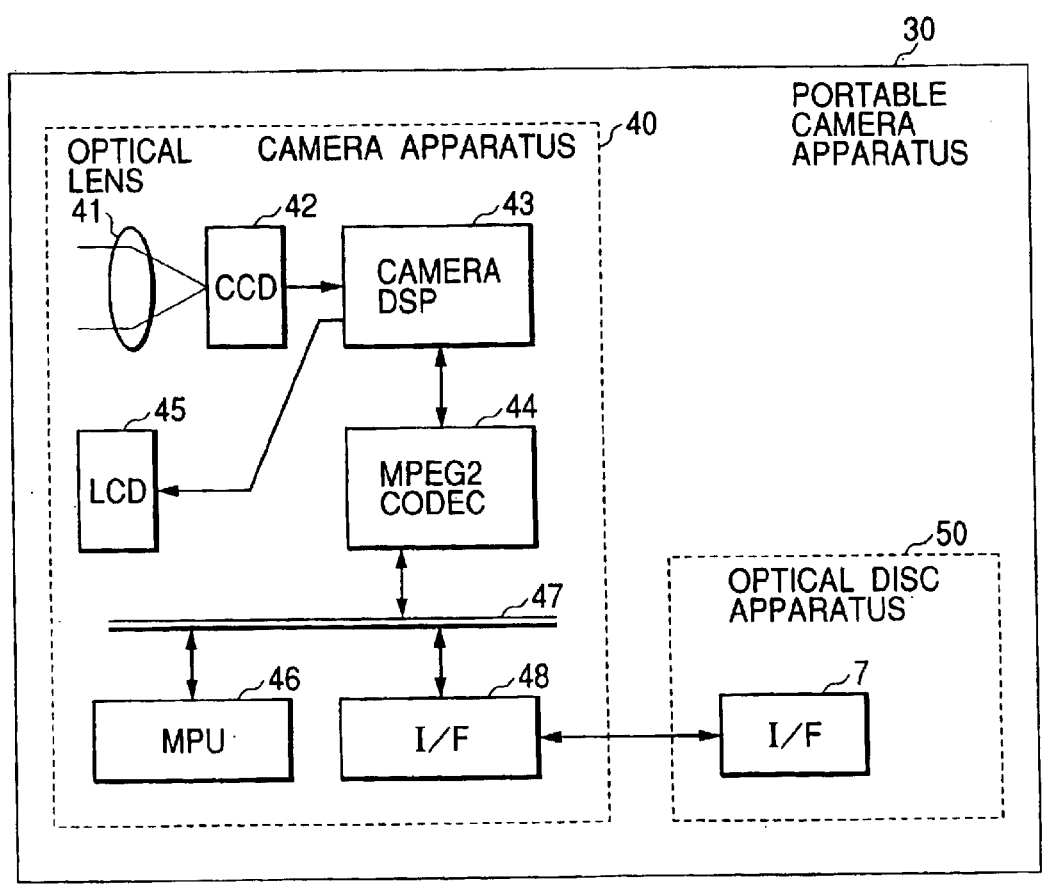
FIG. 14 is a block diagram showing an example in a DVD camera according to a sixth embodiment.

Next, an embodiment when the present invention applies to a DVD video camera 30 is described with reference to FIG. 14. A DVD video camera is a portable camera unit that uses an optical disc of a small-diameter DVD format as a recording medium. FIG. 14 shows a block diagram of an example of the device configuration to which the present invention is applied. This embodiment has a camera unit 40 and an optical disc apparatus 50 of the first embodiment. The camera unit 40 has an image pick-up lens 41, a CCD 42, a camera DSP 43, an MPEG 2, a CODEC 44, an ECD 45, an MPU 46, a bus 47, an I/F 48, and a buffer memory not shown. The camera unit 40 and the optical disc apparatus 50 are mutually connected via the respective interfaces 48 and 7. The microprocessor MPU 46 at the camera side controls the entire system.

An object image is focused on the CCD 42 via the image pick-up lens 41. The object image is converted to an electric signal by the CCD 42. Then necessary signal processing, such as correction of unintentional movement of the hands, is performed by the camera DSP 43 and the image is converted to a signal of a format that can be converted according to the MPEG standard. In the MPEG-2 CODEC 44, an image information signal sent from the camera DSP 43 is compressed by the MPEG-2 compression method and converted to a data format that can be recorded in an optical disc. When the information is recorded in the optical disc 1, although the recording is interrupted while the information is being accessed, such as positioning in the optical disc 50, the information to be recorded in the meantime is buffered by a buffer memory. The recording of the information into the optical disc 1 is faster than the conversion rate of the MPEG-2 compression. In particular, since the recording is restarted before the buffer memory exceeds the data capacity so long as no error occurs, the data moving image information recorded on the optical disc 1 will not become discrete. The method for managing the relationship between a recording rate, a buffer time, and an access time is defined in the real time recording standard not to overflow this buffer memory. In the DVD camera, the recorded information includes the presentation data that is moving image information and the navigation data that indicates the recorded file address or the like. The presentation data is recorded for the real time recording and the navigation data is recorded for the recording with verify. The reliability of each data can be secured by switching the recording power corresponding to these two types of file data.

Seventh Embodiment

Figure 15:
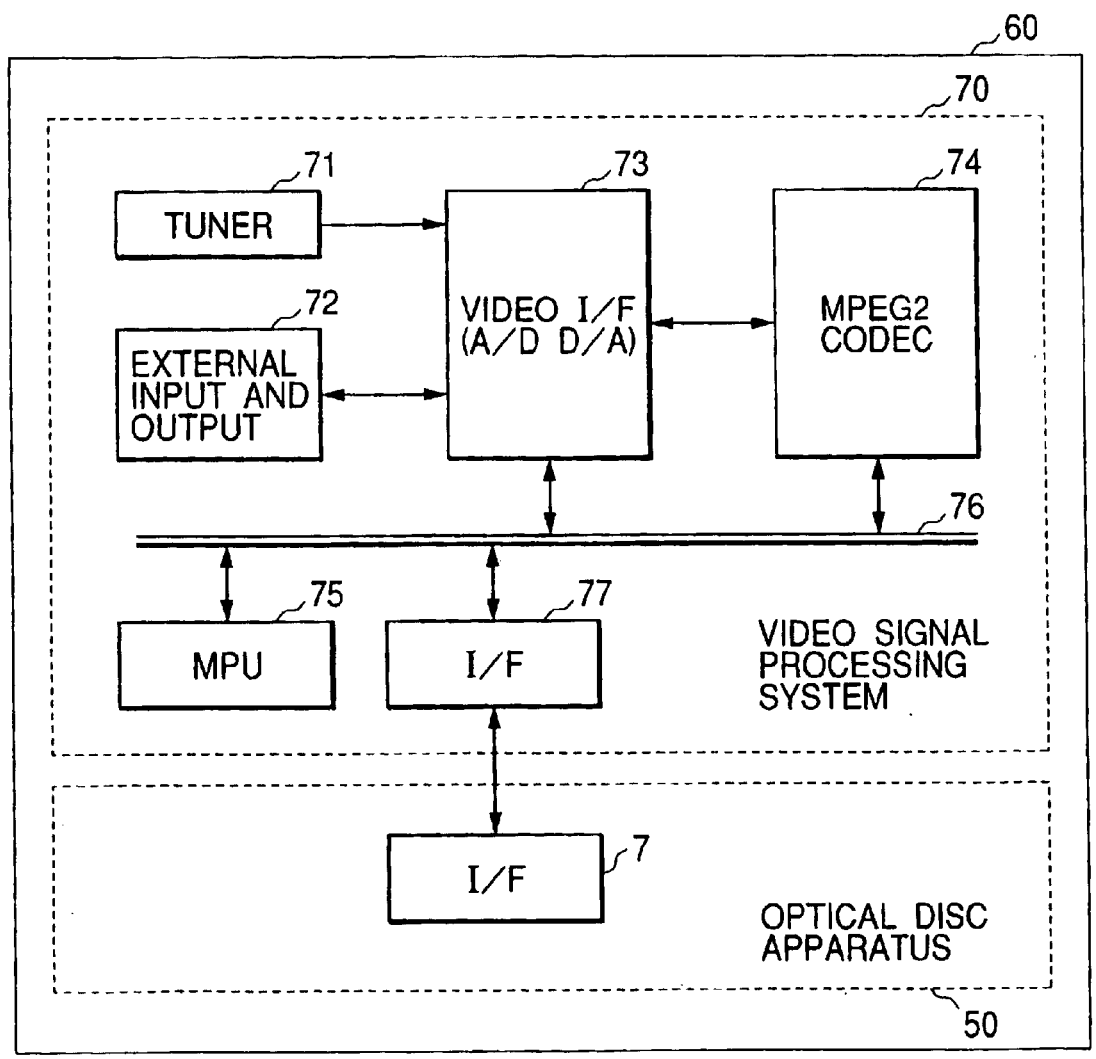
FIG. 15 is a block diagram showing an example in a DVD video recorder according to a seventh embodiment.

Next, an embodiment when the present invention applies to a DVD video recorder 60 is described. FIG. 15 shows a block diagram of the DVD video recorder 60 to which the present invention applies. This embodiment has a video signal processing system 70 and the optical disc apparatus 50 of the second embodiment. The video signal processing system 70 has a tuner 71, an external input and output 72, a video I/F 73, an MPEG-2 CODEC 74, an MPU 75, a buffer 76, an I/F 77, and a buffer memory not shown.

The image data input from the tuner 71 and the external input and output 72 is converted to digital data by an A/D converter incorporated in the video I/F 73 for an analog signal. Subsequently, proper signal processing that can convert the data to the MPEG-2 is performed and the MPEG-2 data is compressed by the MPEG-2 CODEC 74. The video signal processing system 70 and the optical disc apparatus 50 are mutually connected via each of the interfaces 77 and 7. The MPU 75 of the signal processing system 70 controls the entire system. Regarding data formats after they are compressed and their recording methods into an optical disc, the same manner of the sixth embodiment is used. As a result, an information recording apparatus that records image or musical information from various information with high reliability can be implemented.

Besides, it is evident that there are not only the embodiment but also many forms in which the present invention is executed without changing its essence.

What is claimed is:

1. An optical disc apparatus, comprising:
    a system controller that receives a recording control command via an interface;
    a recording control block that receives a recording method command signal indicative of one of recording with verify and real time recording and recording data from the system controller, sets a recording power level in accordance with the recording method specified with the recording method command signal, converts recorded information to a format of a recording mark, and generates a recording pulse; and
    an optical head that modulates the power of laser beam using the recording pulse sent from the control block and records the recording data on an information recording medium;
    wherein the recording data is recorded in the information recording medium according to the recording with verify and the real time recording using different recording power respectively, in which under the recording with verify, the recording power determined by recording compensation learning is used, and under the real time recording, the recording cower higher than the recording power obtained by the recording compensation learning is used.

2. The optical disc apparatus according to claim 1, wherein one track or more at the top and rear end of a file of the data recorded for the real time recording is recorded using lower recording power.

3. The optical disc apparatus according to claim 2, wherein the recording data of the number of blocks including one track or more at the top and rear end of the file of the data recorded for the real time recording is recorded using the lower recording power.

4. The optical disc apparatus according to claim 1, wherein only the recording data of the number of sectors for one track or more at the top and rear end of the file of the data recorded for the real time recording is recorded using the lower recording power.

5. The optical disc apparatus according to claim 1, wherein the recording power toward a radial direction is in a mode in which the recording data is recorded at a fixed angular velocity according to one of the recording with verify and the real time recording, in which under the recording with verify, the recording power determined based on a linear approximation of the recording power obtained by the recording compensation learning in which the recording power is obtained on the inside tracks and outside tracks respectively is used, and in which under the real time recording, the recording power higher in constant proportion than the recording power determined based on the linear approximation is used.

6. An information recording apparatus, comprising:
    an input unit that inputs either moving image information or voice information or both;
    an optical disc apparatus as in any one of claims 1 and 2–5 that can reproduce recorded contents; and a controller.

7. The information recording apparatus according to claim 6, wherein the digital compression unit uses the MPEG-2 method.

8. The information recording apparatus according to claim 7, wherein the information recorded for the recording with verify is navigation data, and the information recorded for the real time recording is presentation data.

9. An information recording apparatus, comprising:
    an image pick-up lens;
    an image sensor that converts an image focused by the image pick-up lens to an electrical signal;
    a unit that digitally compresses the output of the image sensor;
    an optical disc apparatus as in any one of claims 1 and 2–5 that can reproduce recorded contents; and a controller.

10. The information recording apparatus according to claim 9, wherein the digital compression unit uses the MPEG-2 method.

11. The information recording apparatus according to claim 10, wherein the information recorded for the recording with verify is navigation data, and the information recorded for the real time recording is presentation data.

* * * * *